July 5, 1966  C. R. AUSTIN  3,259,483

METHOD OF SINTERING

Filed Nov. 6, 1961

INVENTOR.
CHESTER R. AUSTIN
BY James E. Toomey
ATTORNEY 3,259,483
METHOD OF SINTERING
Chester R. Austin, Martinez, Calif., assignor to Kaiser Industries Corporation, Oakland, Calif., a corporation of Nevada
Filed Nov. 6, 1961, Ser. No. 150,512
2 Claims. (Cl. 75—5)

The present invention relates to methods of sintering finely divided materials and, more particularly, methods of sintering finely divided materials in such a manner that said materials are highly heated and are bonded by thermal reaction.

It frequently happens that ores and other materials are in a finely divided form in which they are difficult to treat by normal materials handling methods. Large amounts of dust are formed and considerable amounts of material are lost because of the small size of the particles and, in general, processing of these finely divided materials is very inefficient. One method of avoiding this problem is by agglomerating the finely divided particles into larger size particles which then may be more readily processed. One type of agglomeration is known as sintering. In prior art sintering processes, air is passed through a mixture of particles of finely divided material to be sintered and a fuel material and, upon ignition, the particles are heated and tend to bond together.

The subject invention allows the sintering process to proceed more rapidly, permits larger quantities of material to be sintered on standard size apparatus, increases the efficiency of the sintering operation, and in some cases increases the quality of the sintered product.

The various purposes and advantages of this invention will be more apparent from a review of the following detailed description when taken in conjunction with the accompanying drawings, throughout which like reference characters indicate like parts and wherein.

Figure 1:
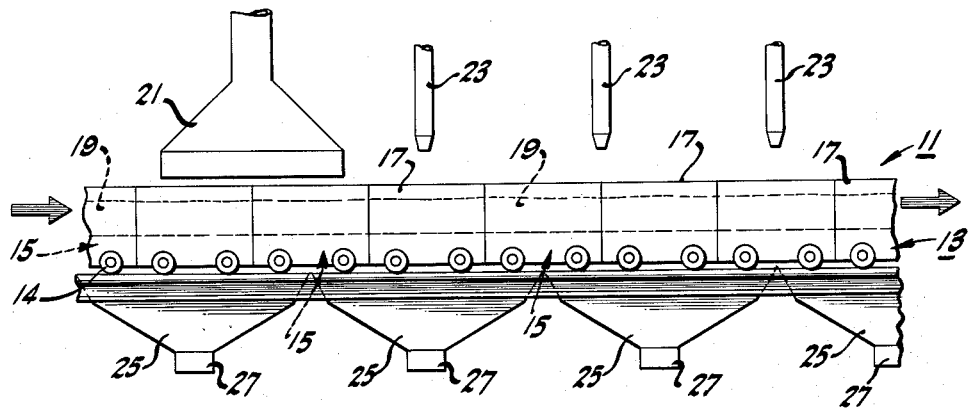
FIG. 1 is a schematic side view of a portion of a sintering apparatus constructed in accordance with one embodiment of this invention.

In FIG. 1 a finely divided mixture 19 of a suitable material to be sintered is mixed with a suitable fuel material, such as finely divided coke, coal, charcoal, etc., and is passed into the sintering machine 11 on a conveyor 13. This mixture 19 may be dampened, if desired. Suitable materials which can be sintered in accordance with this invention include ferrous ores, such as hematite, magnetite, siderite, limonite, pyrites, etc.; non-ferrous ores, such as oxides and sulfides of manganese, zinc, lead and nickel; minerals, such as phosphate rock, clay, boiler fly ash, etc.; and other materials, such as flue dust, mill scale, aniline sludge, etc. The conveyor 13 is comprised of a number of pallets 15 which have bottoms in the form of grates 16 or similar apparatus such that the mixture 19 of the finely divided material to be sintered and fuel material is held on the pallets 15 but, as will be explained later, certain gaseous materials may pass through the pallets 15 and through the mixture 19. As shown more clearly in FIG. 2, the pallet grates 16 are supported by grate supports 18. Openings 20 in the grates 16 are shown in their long dimension with the width of the opening being a small fraction of the length so that the finely divided particles do not fall through. The pallets 15 are supported by and move on wheels 14. The pallets 15 also include pallet side portions 17 which assist in maintaining the mixture 19 in proper position on the conveyor 13. The mixture 19 passes under an ignition furnace 21 which, for example, may be gas-fired or oil-fired, and which serves to ignite a portion of the fuel material in the mixture 19.

After passing out from under the ignition furnace 21, the mixture 19 is exposed to a gaseous atmosphere of a suitable composition which is drawn through the porous mixture 19, through the bottom of the pallet 15 and into a windbox 25 and thereafter through a windbox outlet 27 into suitable exhaust means (not shown). The atmosphere is passed through the mixture 19 because of a suitable blowing system, which, in this particular embodiment, is attached to the windbox outlet 27 so that a suction is created on the bottom surface of the porous mixture 19 which draws the atmosphere through the mixture 19.

In the past, air has been used as the atmosphere which passes through the porous mixture 19 and in many instances this gave satisfactory results as the particles would be highly heated and would bond together. However, in accordance with this invention, it is found that if oxygen is added to the air, thus forming an oxygen-enriched atmosphere, a number of desirable results occur. First it is found that if suitable amounts of oxygen are added to air that the ignition and combustion of the fuel proceeds faster through a predetermined depth of the porous mixture 19 which results more quickly in the high heat and the thermal reaction necessary to bond together the particles of finely divided material. It is found that, therefore, the thickness of the porous mixture 19 being sintered may be increased considerably, thereby permitting larger quantities of material to be conveyed on the conveyor 13 and yet the finely divided materials are agglomerated and sintered with excellent results. In addition, if it is not considered desirable to increase the thickness of the layer of porous material, it is possible to increase the speed of the conveyor 13 because, as the combustion and high heating proceeds through the porous mixture 19 at a higher rate, a layer of particular thickness will be properly sintered in a shorter time. Thus it can be seen that using the same size apparatus a larger quantity of material may be sintered in a given period of time. In addition it is also found in some instances that the oxygen-enriched atmosphere provides a more thorough and better sintering action which results in a product which is more easily handled.

Although the subject invention is not to be limited thereby, one theory of the mechanism involved is that the sintering rate is increased by the oxygen-enrichment because of an increase in the surface point defects of the material to be sintered which are due to oxygen adsorption. This increase in surface point defects increases the apparent diffusion coefficients and thereby increases the sintering rate.

The atmosphere to be passed through the porous mixture 19 may be provided and its composition may be controlled in a number of ways. In FIG. 1 there is shown a number of inlets 23 which may be used to pass oxygen into the atmosphere above the porous mixture 19 in such a manner as to enrich it by an appropriate amount. The inlet 23 may be fitted with a suitable nozzle or vanes or other gas-directing means in order to spread the oxygen evenly over the surface of the porous mixture 19 so that the gas entering the porous mixture 19 will have approximately the same composition in all portions of the upper surface of the mixture 19. This particular embodiment is suitable when comparatively small amounts of oxygen are desired for enriching the atmosphere and when absolute control of the composition of the atmosphere is not as necessary as in other instances.

Figure 2:
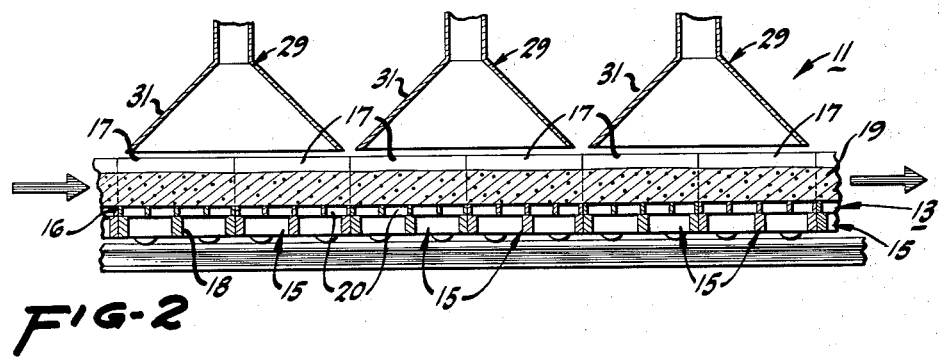
FIG. 2 is a schematic sectional view of a portion of a sintering apparatus constructed in accordance with another embodiment of this invention.

In FIG. 2 there is shown an embodiment in which flared inlets 29 are used to supply the oxygen. In some cases, it may be desirable to use the inlets 29 to supply an oxygen-enriched atmosphere which has been enriched previous to being passed through the inlet 29. The inlet 29 includes an inlet flared portion 31 in the nature of a hood which may be used to prevent substantial contamination or dilution of the gaseous material passing through the inlet 29 by the surrounding atmosphere outside the inlet 29. This particular embodiment is suitable when more control is desired over the actual composition of the atmosphere than is the case in FIG. 1 and may be used when larger percentages of oxygen are used than are used in the apparatus of FIG. 1. It can be seen that as comparatively small amounts of the surrounding atmosphere outside the inlet 29 are passed through the porous mixture 19 and as most of the gaseous material passing through the porous mixture 19 comes through the inlet 29, much more accurate control is obtained.

In some instances it may be desirable to very accurately and completely control the composition of the gaseous material passing through the porous mixture 19. This may be done by use of the apparatus shown in FIG. 3, in which an enclosure 33 surrounds the conveyor 13. Inlets 35 provide the gaseous material which passes through the porous mixture 19. This gaseous material may be air which has been previously enriched with oxygen or may be composed of mixtures of oxygen and other gases, such as nitrogen. In both FIGS. 2 and 3 it may be desirable to utilize nozzles, vanes or other gas-directing means to insure that the gas passing through the inlet 29 or 35 is spread evenly over the surface of the porous mixture 19 so that the gaseous material entering the porous mixture 19 has a uniform composition in all areas and therefore provides a uniform sintered product.

In accordance with this invention it has been found that additions of oxygen to air or atmospheres having larger percentages of oxygen than air will frequently provide improved results over prior art over a wide range of oxygen pecentages, depending upon the particular circumstances involved. Normally air contains approximately 21% (20.99%) oxygen by volume. (In the specification and in the claims of this application all percentages are by volume.) Thus it may be stated that if the oxygen-enriched atmosphere contains any percentage of oxygen greater than 21%, a more desirable result can be obtained. However, it has been determined that the preferable range for oxygen content of the gaseous material passing through the porous mixture 19 is from 30% to 75%. In some instances it has been found that if greater than 75% oxygen is used, the combustion proceeds too rapidly, thus damaging the apparatus and, on occasion, providing improperly sintered material. Also it has been noted on occasion that the combustion may proceed so rapidly on the top of the porous mixture that a nearly liquid state is obtained which blocks or reduces the penetration of the gaseous material through the porous mixture 19 and provides improper sintering. Also, in some instances, it has been found that if the percentage of oxygen is less than 30% that the amount of increase in sintering capacity over the use of normal air is not sufficient to warrant the changes in the apparatus and that no particular benefit results. However, this depends on the particular circumstances involved.

While in most instances merely enriching normal air with oxygen provides satisfactory results, in some cases it may be desirable to create an atmosphere by mixing oxygen and other inert gases, such as nitrogen.

Figure 3:
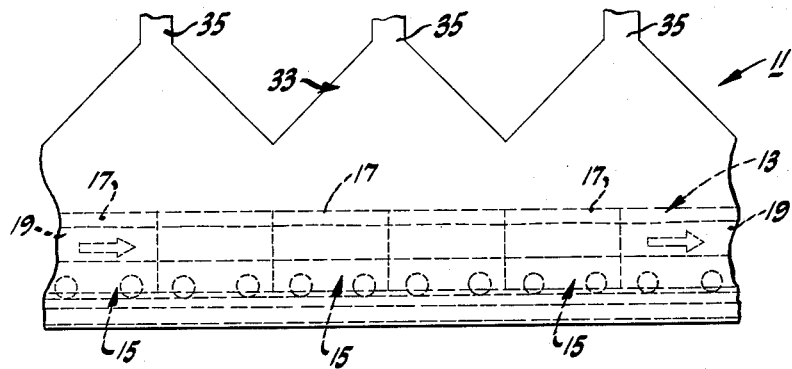
FIG. 3 is a schematic side view of a portion of a sintering apparatus constructed in accordance with still another embodiment of this invention.

It can readily be appreciated that by utilizing the apparatus shown in FIG. 2, or especially FIG. 3, the exact percentage of oxygen in the atmosphere may be exactly controlled and that therefore the thickness and/or the rate and the quality of the sintering may be accurately controlled. These factors may be varied in accordance with the composition of the atmosphere used at any particular time and also in accordance with the particular material to be sintered and the particular fuel material used. It is found that this invention may be used with any of the normal materials which may be desired to be sintered and that the normal fuels may also be used. In some instances it may even be desirable to use oil as the fuel and have it soak through the porous mixture previous to ignition. Also it is possible to inject a gaseous fuel, such as natural gas, into the material to be sintered in place of, or in addition to, the use of a solid or liquid fuel. This injection of a gaseous fuel is to be included in the concept of providing a mixture of fuel and material to be sintered.

For increased efficiency it may be desirable in some instances to use a pre-heated or pre-ignited fuel which would permit the use of a smaller ignition furnace or, in the case of the pre-ignited fuel, would eliminate the ignition furnace altogether.

Although as shown in FIGS. 1, 2 and 3 the atmosphere passes downwards from the top to the bottom of the porous mixture 19, in some instances it may be desirable to pass the gas upward from the bottom to the top of the porous mixture 19 and thus the windboxes 25 or a suitable hood or similar apparatus may be positioned above the mixture rather than below.

The finely divided material entering the sintering machine is normally comprised of particles having a diameter of about $3/8$ inch or less, although certain materials up to minus one inch size may be sintered if desired. The solid fuel material is normally made of particles having a diameter of about $1/8$ inch or less. On occasion, it may be desirable to include lime or limestone in particles having a diameter of about $1/8$ inch or less in the mixture 19.

It is understood, of course, that the sintered product may be in the form of large cakes or a mass which may need to be broken up to obtain particles of the size desired.

While the present invention has been shown in a few forms only, it will be obvious to those skilled in the art that various changes and modifications may be made therein without departing from the spirit and scope thereof as set forth in the appended claims.

What is claimed is:

1. A method of sintering finely divided ferrous materials, including the steps of providing a porous mixture of finely divided ferrous particles and a fuel material, igniting at least a portion of said fuel material in said mixture, passing said mixture through an enclosure containing an atmosphere comprising of from about 30% to about 75% oxygen and passing said atmosphere through said ignited mixture so that said finely divided materials are highly heated and bonded together by thermal reaction.

2. A method of sintering finely divided ferrous materials including the steps of providing a porous mixture of finely divided ferrous particles and a fuel material, said mixture having an upper surface, igniting at least a portion of said fuel material in said mixture passing said mixture through an enclosure, injecting an oxygen-containing gas into the atmosphere adjacent said upper surface of said ignited mixture, passing said atmosphere through said mixture, adjusting the rate of oxygen-containing gas injection and the rate of passage of said atmosphere through said mixture so that said atmosphere, on entering said mixture, comprises from about 30% to about 75% oxygen so that said finely divided materials are highly heated and bonded together by thermal reaction.

References Cited by the Examiner

UNITED STATES PATENTS

| | | | |
|---|---|---|---|
| 2,380,056 | 7/1945 | Lloyd | 75—5 |
| 2,717,205 | 9/1955 | Edwards | 75—5 |
| 2,750,274 | 6/1956 | Lellep | 75—5 |

FOREIGN PATENTS 573,539  11/1945  Great Britain.

BENJAMIN HENKIN, *Primary Examiner.*

DAVID L. RECK, *Examiner.*

N. F. MARKVA, *Assistant Examiner.*